(12) United States Patent
Fornshell et al.

(10) Patent No.: US 12,185,112 B2
(45) Date of Patent: Dec. 31, 2024

(54) TEMPORARY PAIRING FOR WIRELESS DEVICES

(71) Applicant: Apple Inc., Cupertino, CA (US)

(72) Inventors: Natalia A. Fornshell, Campbell, CA (US); Aarti Kumar, Los Altos, CA (US); Robert D. Watson, Menlo Park, CA (US); Ariane Cotte, San Francisco, CA (US); Bob Bradley, San Jose, CA (US); Marc J. Krochmal, Santa Clara, CA (US); Kang Sun, Sunnyvale, CA (US); Chen Ganir, San Jose, CA (US); Sarang S. Ranade, San Jose, CA (US); Akshay Mangalam Srivatsa, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/368,543

(22) Filed: Sep. 14, 2023

(65) Prior Publication Data

US 2024/0007863 A1 Jan. 4, 2024

Related U.S. Application Data

(63) Continuation of application No. 16/428,652, filed on May 31, 2019, now Pat. No. 11,997,496.

(51) Int. Cl.
*H04W 4/80* (2018.01)
*H04W 12/041* (2021.01)
(Continued)

(52) U.S. Cl.
CPC ............ *H04W 12/50* (2021.01); *H04W 4/80* (2018.02); *H04W 12/041* (2021.01);
(Continued)

(58) Field of Classification Search
CPC ... H04W 12/50; H04W 12/041; H04W 12/61; H04W 12/63; H04W 12/0471;
(Continued)

(56) References Cited

U.S. PATENT DOCUMENTS 7,746,810 B2   6/2010  Sinha et al.
7,925,285 B2*  4/2011  Indirabhai ............. H04W 56/00
                                                            375/354

(Continued)

FOREIGN PATENT DOCUMENTS

CN   105262662 A   1/2016
CN   105284073 A   1/2016
(Continued)

OTHER PUBLICATIONS

Chinese Office Action from Chinese Patent Application No. 202010472916.2, dated Feb. 3, 2024, 15 pages including English language translation.

(Continued)

*Primary Examiner* — Cindy Trandai
(74) *Attorney, Agent, or Firm* — BAKERHOSTETLER

(57) ABSTRACT

A device providing temporary pairing for wireless devices may include a memory and at least one processor configured to receive a request to temporarily pair with a wireless device. The at least one processor may be further configured to pair with the wireless device, wherein the pairing comprises generating a link key for connecting to the wireless device. The at least one processor may be further configured to connect to the wireless device using the link key. The at least one processor may be further configured to initiate a timer upon disconnecting from the wireless device. The at least one processor may be further configured to automatically and without user input, delete the link key when the
(Continued)

timer reaches a timeout value without having reconnected to the wireless device using the link key.

20 Claims, 7 Drawing Sheets

(51) Int. Cl.
   *H04W 12/0471* (2021.01)
   *H04W 12/50* (2021.01)
   *H04W 12/61* (2021.01)
   *H04W 12/63* (2021.01)

(52) U.S. Cl.
   CPC ....... *H04W 12/0471* (2021.01); *H04W 12/61* (2021.01); *H04W 12/63* (2021.01)

(58) Field of Classification Search
   CPC ......... H04W 4/80; H04W 4/70; H04W 76/14; H04W 76/23; H04W 76/15; H04W 76/00; H04W 76/10; H04M 1/6066; H04M 2250/02; G06F 3/165
   See application file for complete search history.

(56) References Cited

U.S. PATENT DOCUMENTS

| | | | |
|---|---|---|---|
| 8,289,890 B2 | 10/2012 | Murayama | |
| 8,295,766 B2* | 10/2012 | Zimbric | H04M 1/72412 455/569.1 |
| 8,943,605 B1 | 1/2015 | Martin | |
| 9,218,700 B2 | 12/2015 | Gautama | |
| 9,820,323 B1 | 11/2017 | Young et al. | |
| 9,924,010 B2* | 3/2018 | Watson | H04W 76/36 |
| 10,063,688 B1 | 8/2018 | Sinibaldi | |
| 10,159,105 B1* | 12/2018 | Linsky | H04L 69/24 |
| 10,331,098 B2* | 6/2019 | Song | H04N 21/41265 |
| 10,630,466 B1 | 4/2020 | Wilbur | |
| 10,827,251 B2* | 11/2020 | Koss | H04W 76/20 |
| 10,938,873 B2* | 3/2021 | Celinski | H04M 3/563 |
| 11,153,678 B1* | 10/2021 | Jorgovanovic | H04W 76/14 |
| 11,757,629 B2 | 9/2023 | Gupta | |
| 11,778,427 B2* | 10/2023 | Chen | H04W 4/10 455/518 |
| 11,895,456 B2 | 2/2024 | Jorgovanovic | H04M 1/6066 |
| 2004/0215794 A1 | 10/2004 | Lauer | |
| 2005/0188103 A1* | 8/2005 | Chen | H04W 92/18 709/208 |
| 2006/0154663 A1 | 7/2006 | Son | |
| 2009/0081999 A1 | 3/2009 | Khasawneh | |
| 2009/0238375 A1 | 9/2009 | Pilati | |
| 2012/0084446 A1 | 4/2012 | Linuma | |
| 2012/0237053 A1* | 9/2012 | Alam | H04R 5/04 381/80 |
| 2012/0272055 A1 | 10/2012 | Jung | |
| 2013/0117693 A1* | 5/2013 | Anderson | H04L 65/403 715/753 |
| 2013/0166910 A1 | 6/2013 | Wilkinson | |
| 2013/0258408 A1 | 10/2013 | Mizutani | |
| 2013/0316649 A1 | 11/2013 | Newham | |
| 2014/0099889 A1 | 4/2014 | Seo | |
| 2014/0359272 A1 | 12/2014 | Hiltunen | |
| 2015/0145648 A1 | 5/2015 | Winkelman | |
| 2015/0200715 A1 | 7/2015 | Oiwa | |
| 2015/0207626 A1 | 7/2015 | Neftel | |
| 2015/0295901 A1 | 10/2015 | Woodward | |
| 2015/0304022 A1 | 10/2015 | Murayama | |
| 2015/0372746 A1 | 12/2015 | Xie | |
| 2016/0105406 A1 | 4/2016 | Smith | |
| 2016/0112825 A1* | 4/2016 | Miller | H04W 4/80 455/41.2 |
| 2016/0128112 A1 | 5/2016 | Dunsbergen | |
| 2016/0149749 A1 | 5/2016 | Bunker | |
| 2016/0253276 A1 | 9/2016 | Jeong | |
| 2016/0360341 A1 | 12/2016 | Srivatsa et al. | |
| 2016/0360350 A1 | 12/2016 | Watson | |
| 2017/0048613 A1 | 2/2017 | Smus | |
| 2017/0134890 A1 | 5/2017 | Lau | |
| 2018/0007042 A1 | 1/2018 | Weizman | |
| 2018/0009416 A1 | 1/2018 | Miwand | |
| 2018/0027033 A1* | 1/2018 | Kamstrup | H04L 65/764 370/310 |
| 2018/0152786 A1* | 5/2018 | Moeller | H04R 29/001 |
| 2018/0176500 A1 | 6/2018 | Yokomitsu | |
| 2018/0182389 A1 | 6/2018 | Devaraj | |
| 2018/0199176 A1 | 7/2018 | Srivatsa et al. | |
| 2018/0302757 A1* | 10/2018 | Kanbara | H04L 65/60 |
| 2019/0052721 A1 | 2/2019 | Romano | |
| 2019/0230738 A1* | 7/2019 | Desai | H04L 1/1887 |
| 2019/0281449 A1 | 9/2019 | Luo | |
| 2019/0289653 A1 | 9/2019 | Sarkar | |
| 2019/0313198 A1* | 10/2019 | Bittner | H04N 21/2181 |
| 2019/0387128 A1 | 12/2019 | Kawai | |
| 2020/0022198 A1* | 1/2020 | James | H04R 1/1091 |
| 2020/0146097 A1* | 5/2020 | Haartsen | H04M 1/6066 |
| 2020/0244790 A1* | 7/2020 | Sun | H04Q 5/24 |
| 2020/0322788 A1* | 10/2020 | Batra | H04W 8/24 |
| 2020/0337100 A1 | 10/2020 | Chirikov | |
| 2021/0044968 A1 | 2/2021 | Robert | |
| 2023/0345252 A1 | 10/2023 | Bilek | |

FOREIGN PATENT DOCUMENTS

| | | |
|---|---|---|
| CN | 108901010 A | 11/2018 |
| EP | 2581797 | 4/2013 |
| WO | WO 2009/026049 | 2/2009 |

OTHER PUBLICATIONS

European Office Action from European Patent Application No. 20170822.9, dated Mar. 2, 2021, 4 pages.
European Office Action from European Patent Application No. 20170822.9, dated Sep. 9, 2020, 12 pages.
European Search Report from European Patent Application No. 20170822.9, dated Sep. 2, 2020, 6 pages.
Partial European Search Report from European Patent Application No. 20170822.9, dated Jun. 8, 2020, 14 pages.

* cited by examiner

TEMPORARY PAIRING FOR WIRELESS DEVICES

CROSS REFERENCE TO RELATED APPLICATIONS

This application is a continuation of U.S. patent application Ser. No. 16/428,652, entitled "TEMPORARY PAIRING FOR WIRELESS DEVICES," filed on May 31, 2019, the disclosure of which is hereby incorporated herein in its entirety.

TECHNICAL FIELD

The present description relates generally to pairing, including temporary pairing for wireless devices.

BACKGROUND

Users may wirelessly stream audio from an electronic device, such as a phone, to a wireless audio output device, such as a wireless headset, wireless headphones, wireless earbuds, and the like. For example, a user may stream music from their phone to their wireless audio output device, and/or a user may stream incoming audio for a communication session, such as a telephone call, to their wireless audio output device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
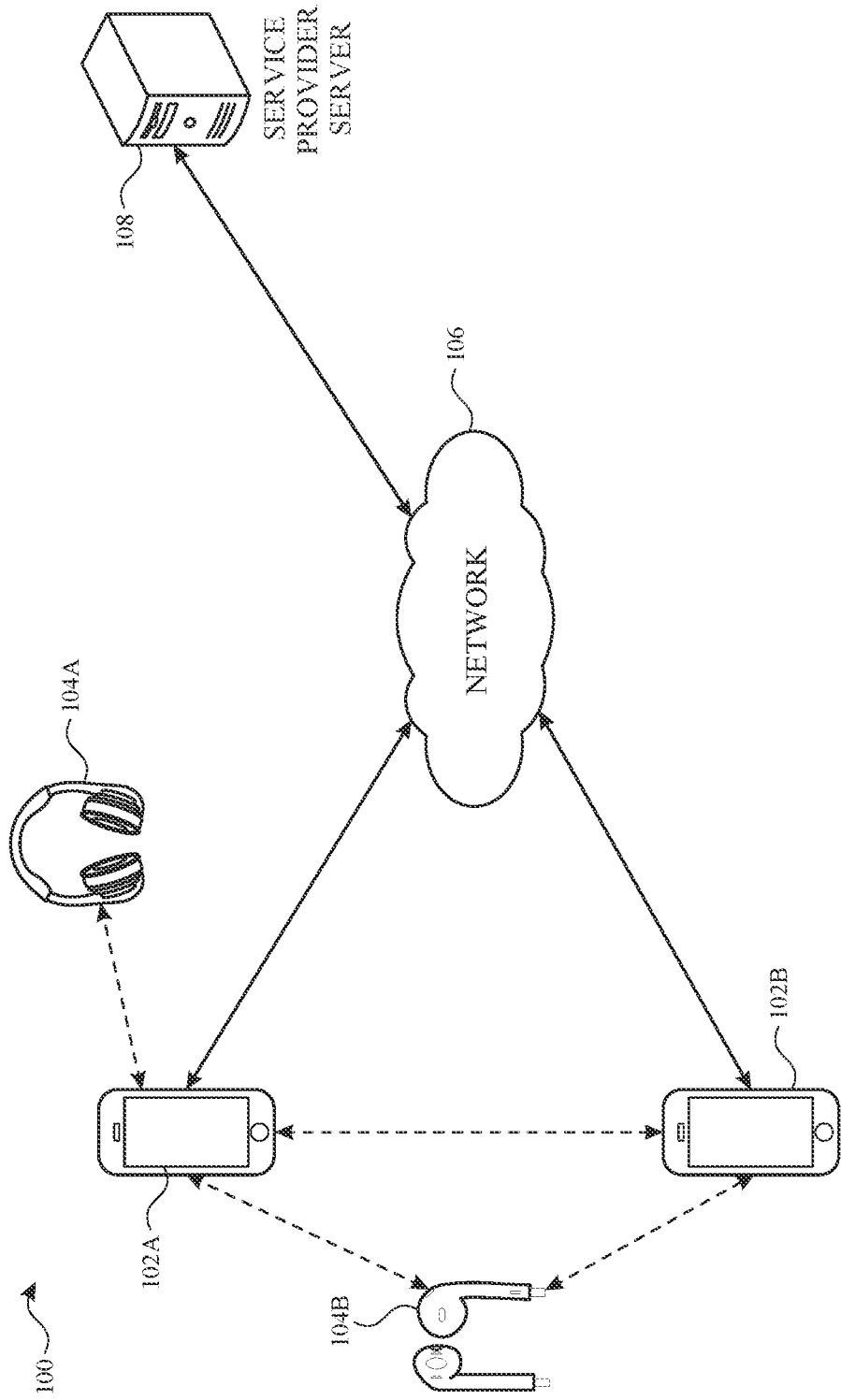
FIG. 1 illustrates an example network environment for concurrent audio streaming to multiple wireless audio output devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user streaming audio from an electronic device, such as a mobile phone or a television, to a wireless audio output device, such as their wireless headset, may wish to concurrently stream audio to another proximate wireless audio output device, such as a wireless headset/earbuds of a friend, family member, companion, etc. For example, a user streaming, e.g., music or a podcast on a mobile device may wish to concurrently stream the music or podcast to the wireless audio output device of another user for a shared listening experience. Similarly, a user streaming audio corresponding to a movie or other video content may wish to concurrently stream the audio or a variation thereof (e.g., a director's commentary) to the wireless audio output device of another user for a shared content viewing experience.

The subject system for concurrent audio streaming to multiple wireless audio output devices allows a user to, directly or indirectly, temporarily pair their electronic device with a wireless audio output device of another user, such as while the user's electronic device is paired and connected to their own wireless audio output device. For example, the user's electronic device may directly temporarily pair with another user's wireless audio output device.

In one or more implementations, when the other user's wireless audio output device is connected to the other user's electronic device, such as the other user's mobile phone, the user's electronic device may indirectly temporarily pair with the other user's wireless audio output device via the other user's electronic device. For example the other user's electronic device may perform a temporary pairing with the other user's wireless audio output device to generate pairing information to be used for the temporary connection between the user's electronic device and the other user's wireless audio output device. The other user's electronic device may provide the temporary pairing information to the user's electronic device, such as via a secure channel.

After directly or indirectly temporarily pairing, the user's electronic device can automatically connect to the wireless audio output device of the other user and stream audio to the wireless audio output device of the other user, e.g., while concurrently streaming audio to their own wireless audio output device. The electronic device may independently control the volume of each of the audio streams, and/or may independently control the content of each of the audio streams. In one or more implementations, the electronic device may utilize a separate profile for each of the wireless audio output devices (e.g., separate advanced audio distribution profiles (A2DP)).

In one or more implementations, the audio streams being concurrently streamed to the wireless audio output devices may be the same audio content, e.g., the same music, in which case the user's electronic device may synchronize one or more audio output synchronization parameters (e.g., a jitter buffer depth) across the wireless audio output devices, such that the audio output by each the wireless audio output devices is substantially synchronized.

The pairing of the user's device to the other user's wireless audio output device may be referred to as 'temporary' because after the other user's wireless audio output device disconnects from the user's electronic device, the user's electronic device automatically, and without user input, deletes the pairing information (e.g., link key) corresponding to the other user's wireless audio output device, such as after the expiration of a timeout period. In this manner, the other user's wireless audio output device cannot subsequently reconnect to the user's electronic device without again pairing. In one or more implementations, the other user's wireless audio output device also may automatically, and without user input, delete the pairing information corresponding to the user's electronic device after disconnecting, such as after the expiration of the timeout period.

For explanatory purposes, the temporary pairing is described with respect to wireless audio output devices. However, the temporary pairing may be used to facilitate temporary connections with any wireless devices, such as wireless styluses, wireless access control devices, wearable devices, wireless printers, wireless home devices (e.g., wireless thermostats, etc.), or generally any wireless device for which access and/or control may be temporarily shared by one user with another user.

FIG. 1 illustrates an example network environment 100 for concurrent audio streaming to multiple wireless audio output devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-B, one or more wireless audio output devices 104A-B, a network 106, and a service provider server 108. The network 106 may communicatively (directly or indirectly) couple, for example, any two or more of the electronic devices 102A-B and/or the service provider server 108. In FIG. 1, the wireless audio output devices 104A-B are illustrated as not being directly coupled to the network 106; however, in one or more implementations, one or more of the wireless audio output devices 104A-B may be directly coupled to the network 106.

The network 106 may be an interconnected network of devices that may include, or may be communicatively coupled to, the Internet. In one or more implementations, connections over the network 106, may be referred to as wide area network connections, while connections between two or more of the electronic devices 102A-B and/or the wireless audio output devices 104A-B, may be referred to as peer-to-peer connections. The service provider server 108 may include one or more server devices and/or network equipment that facilitates providing one or more services to the electronic devices 102A-B over the network 106, such as a secure cloud storage service. The service provider server 108 may be, and/or may include all or part of, the electronic system discussed below with respect to FIG. 7.

One or more of the electronic devices 102A-B may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic devices 102A-B are depicted as mobile phones. One or more of the electronic devices 102A-B may be, and/or may include all or part of, the electronic device discussed below with respect to FIG. 2, and/or the electronic system discussed below with respect to FIG. 7.

One or more of the wireless audio output devices 104A-B may be, for example, a wireless headset device, wireless headphones, one or more wireless earbuds, a smart speaker, or generally any device that includes audio output circuitry and one or more wireless interfaces, such as near-field communication (NFC) radios, WLAN radios, Bluetooth radios, Zigbee radios, and/or other wireless radios. In FIG. 1, by way of example, the wireless audio output device 104A is depicted as a wireless headset and the wireless audio output device 104B is depicted as a set of wireless earbuds. One or more of the wireless audio output devices 104A-B may be, and/or may include all or part of, the wireless audio output device discussed below with respect to FIG. 2, and/or the electronic system discussed below with respect to FIG. 7.

One or more of the wireless audio output devices 104A-B may be paired, such as via Bluetooth, with one or more of the electronic devices 102A-B. The pairing of a wireless audio output device 104A to an electronic device 102A may involve generating a link key that is shared between the two devices 102A, 104A, which is discussed further below with respect to FIG. 2. After the two devices 102A, 104A are paired together, the devices 102A, 104A may automatically form a secure peer-to-peer connection using the link key when located proximate to one another, such as within Bluetooth communication range of one another. For example, the devices 102A, 104A may use the link key to generate a session key that is used to secure the connection. However, if the devices 102A, 104A unpair and/or if the link key is deleted at one or more of the devices 102A, 104A, the devices 102A, 104A may no longer be able to automatically form a secure peer-to-peer connection unless the pairing process is re-performed. The electronic devices 102A-B may stream audio, such as music, phone calls, and the like, to their respective paired and connected wireless audio output devices 104A-B.

In one or more implementations, one or more of the electronic devices 102A-B and/or one or more of the wireless audio output devices 104A-B may be associated with and/or registered to a same (common) user account via the service provider server 108. For example, the electronic device 102A and the wireless audio output device 104A may be associated with a first user account and the electronic device 102B and the wireless audio output device 104B may be associated with a second user account. The service provider server 108 may allow the electronic devices 102A-B, such as the electronic device 102A to securely store, via a cloud storage service, pairing information, such as link keys, corresponding to other devices associated with the same user account, such as the wireless audio output device 104A. Other devices associated with the user account, such as a tablet device [not shown], may be able to retrieve the pairing information for the wireless audio output device 104A from the service provider server 108 in order to establish a wireless connection with the wireless audio output device 104A.

The subject technology allows an electronic device, such as the electronic device 102A to concurrently connect to multiple of the wireless audio output devices 104A-B, and concurrently stream audio to each of the connected wireless audio output devices 104A-B, such as to provide a shared listening session. For example, the user of the electronic device 102A may be streaming music from the electronic device 102A to the wireless audio output device 104A and the user may wish for the user of the electronic device 102B to hear the streaming music on the wireless audio output device 104B.

The subject technology allows the electronic device 102A to temporarily pair with the wireless audio output device 104B, connect to the wireless audio output device 104B, and then concurrently stream the audio, e.g., music, to both of the wireless audio output devices 104A-B. The pairing may be considered temporary in the sense that the electronic device 102A and/or the wireless audio output device 104B may automatically, and without user input, delete the pairing information after the audio sharing session is complete, such when the devices 102A, 104B do not reconnect for a threshold amount of time. An example process of the electronic device 102A temporarily pairing with the wireless audio output device 104B is discussed further below with respect to FIG. 3.

The subject technology further allows the electronic device 102A to independently control the content of the respective audio stream provided to each of multiple wireless audio output devices 104A-B, and to independently control the volume, tone, pitch, bass, and any other audio properties of the respective audio stream provided to each of the wireless audio output devices 104A-B. An example process of concurrent audio streaming from the electronic device 102A to multiple wireless audio output devices 104A-B is discussed further below with respect to FIG. 4.

In one or more implementations, if the wireless audio output device 104B is connected to the electronic device 102B, the electronic device 102A may indirectly pair with the wireless audio output device 104B via the electronic device 102B. For example, the electronic device 102B may perform a pairing process with the wireless audio output device 104B (e.g., on behalf of the electronic device 102A) and the electronic device 102B may provide the generated pairing information to the electronic device 102A. In this manner, the electronic device 102A can connect and stream audio to the wireless audio output device 104B without having directly paired with the wireless audio output device 104B.

An example process of the electronic device 102A configuring concurrent audio streaming via the electronic device 102B (that is wirelessly coupled to the wireless audio output device 104B) is discussed further below with respect to FIG. 5. An example process of the electronic device 102B generally facilitating a temporary connection between a connected wireless device, such as the wireless audio output device 104B, and a proximate electronic device, such as the electronic device 102A, without a direct pairing of the devices 102A, 104B, is discussed further below with respect to FIG. 6.

Figure 2:
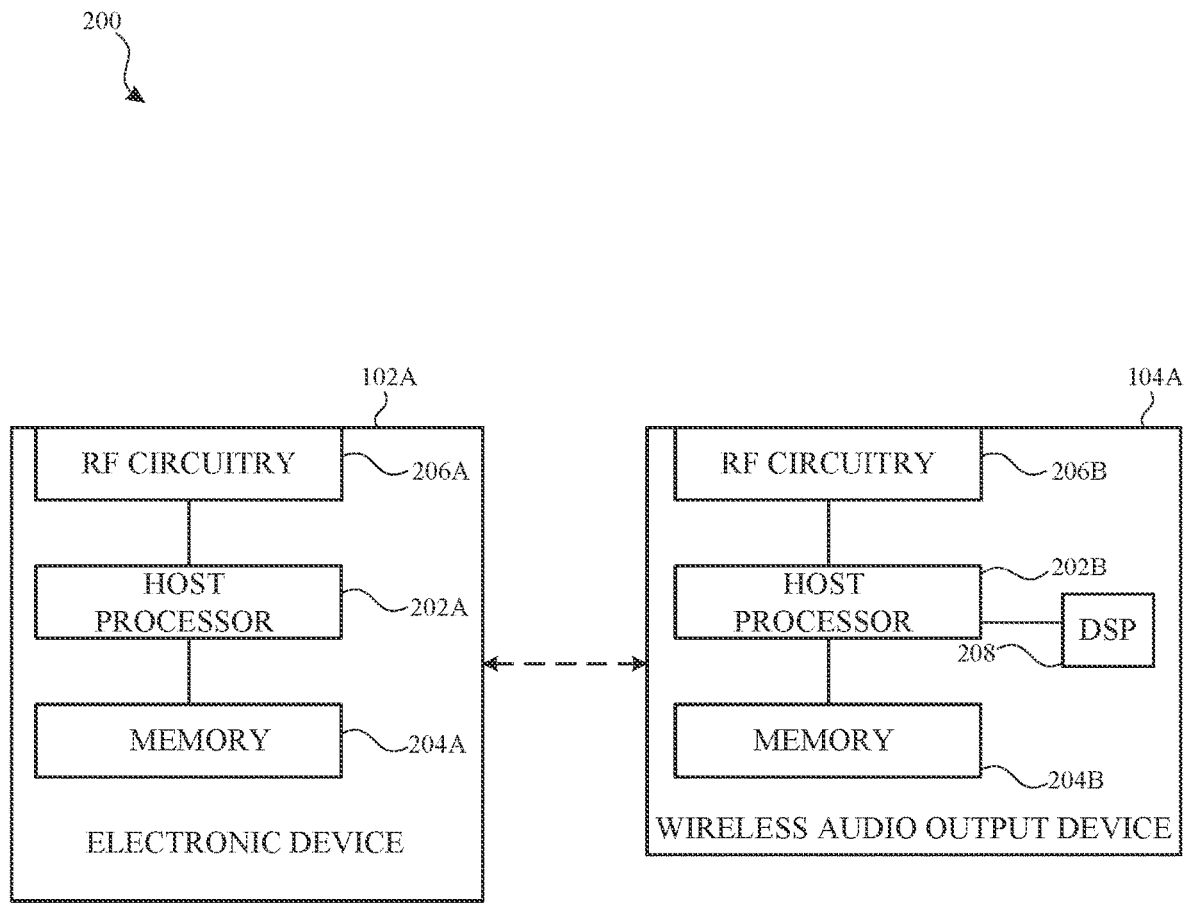
FIG. 2 illustrates an example peer-to-peer network environment including an example electronic device and an example wireless audio output device in accordance with one or more implementations.

FIG. 2 illustrates an example peer-to-peer network environment 200 including an example electronic device 102A and an example wireless audio output device 104A in accordance with one or more implementations. The electronic device 102A is depicted in FIG. 2 for explanatory purposes; however, one or more of the components of the electronic device 102A may also be implemented by the other electronic device 102B. Similarly, the wireless audio output device 104A is depicted in FIG. 2 for explanatory purposes; however, one or more of the components of the wireless audio output device 104A may also be implemented by the other wireless audio output device 104B. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include a host processor 202A, a memory 204A, and radio frequency (RF) circuitry 206A. The wireless audio output device may include a host processor 202B, a memory 204A, RF circuitry 206B, and a digital signal processor (DSP) 208.

The RF circuitry 206A-B may include one or more antennas and one or more transceivers for transmitting/receiving RF communications, such as WiFi, Bluetooth, cellular, and the like. In one or more implementations, the RF circuitry 206A of the electronic device 102A may include circuitry for forming wide area network connections and peer-to-peer connections, such as WiFi, Bluetooth, and/or cellular circuitry, while the RF circuitry 206B of the wireless audio output device 104A may include Bluetooth, WiFi, and/or other circuitry for forming peer-to-peer connections.

The host processors 202A-B may include suitable logic, circuitry, and/or code that enable processing data and/or controlling operations of the electronic device 102A and the wireless audio output device 104A, respectively. In this regard, the host processors 202A-B may be enabled to provide control signals to various other components of the electronic device 102A and the wireless audio output device 104A, respectively. Additionally, the host processors 202A-B may enable implementation of an operating system or may otherwise execute code to manage operations of the electronic device 102A and the wireless audio output device 104A, respectively. The memories 204A-B may include suitable logic, circuitry, and/or code that enable storage of various types of information such as received data, generated data (such as link keys), code, and/or configuration information. The memories 204A-B may include, for example, random access memory (RAM), read-only memory (ROM), flash, and/or magnetic storage. The DSP 208 of the wireless audio output device 104A may include suitable logic, circuitry, and/or code that enable particular processing.

In one or more implementations, the electronic device 102A may pair with the wireless audio output device 104A in order to generate pairing information that can be used to form a connection, such as a peer-to-peer connection between the devices 102A, 104A. The pairing may include, for example, exchanging communication addresses, such as classic Bluetooth addresses, and generating a link key. In one or more implementations, the link key may be a symmetric key that is used to form a secure connection between the devices 102A, 104A. For example, the devices 102A, 104A may use the link key, e.g. in conjunction with entropy produced by one or both of the devices 102A, 104A, to generate a symmetric session key. The session key may be used by the devices 102A, 104A to form the secure connection.

Thus, after pairing the devices 102A, 104A may store the generated and/or exchanged pairing information, e.g. communication addresses and/or a link key, in the respective memories 204A-B. In this manner, the devices 102A, 104A may automatically, and without user input, connect to each other when in range of communication of the respective RF circuitries 206A-B using the respective pairing information. However, if the pairing between the electronic device 102A and the wireless audio output device 104A is a temporary pairing, such as for a shared audio session, the devices 102A, 104A may, automatically and without user input, delete the respective pairing information from the respective memories 204A-B after the connection is terminated and a reconnection does not occur for a threshold amount of time. In this manner, the devices 102A, 104A cannot re-establish a connection without first re-performing the pairing process and generating new pairing information, e.g. a new link key.

In one or more implementations, one or more of the host processors 202A-B, the DSP 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
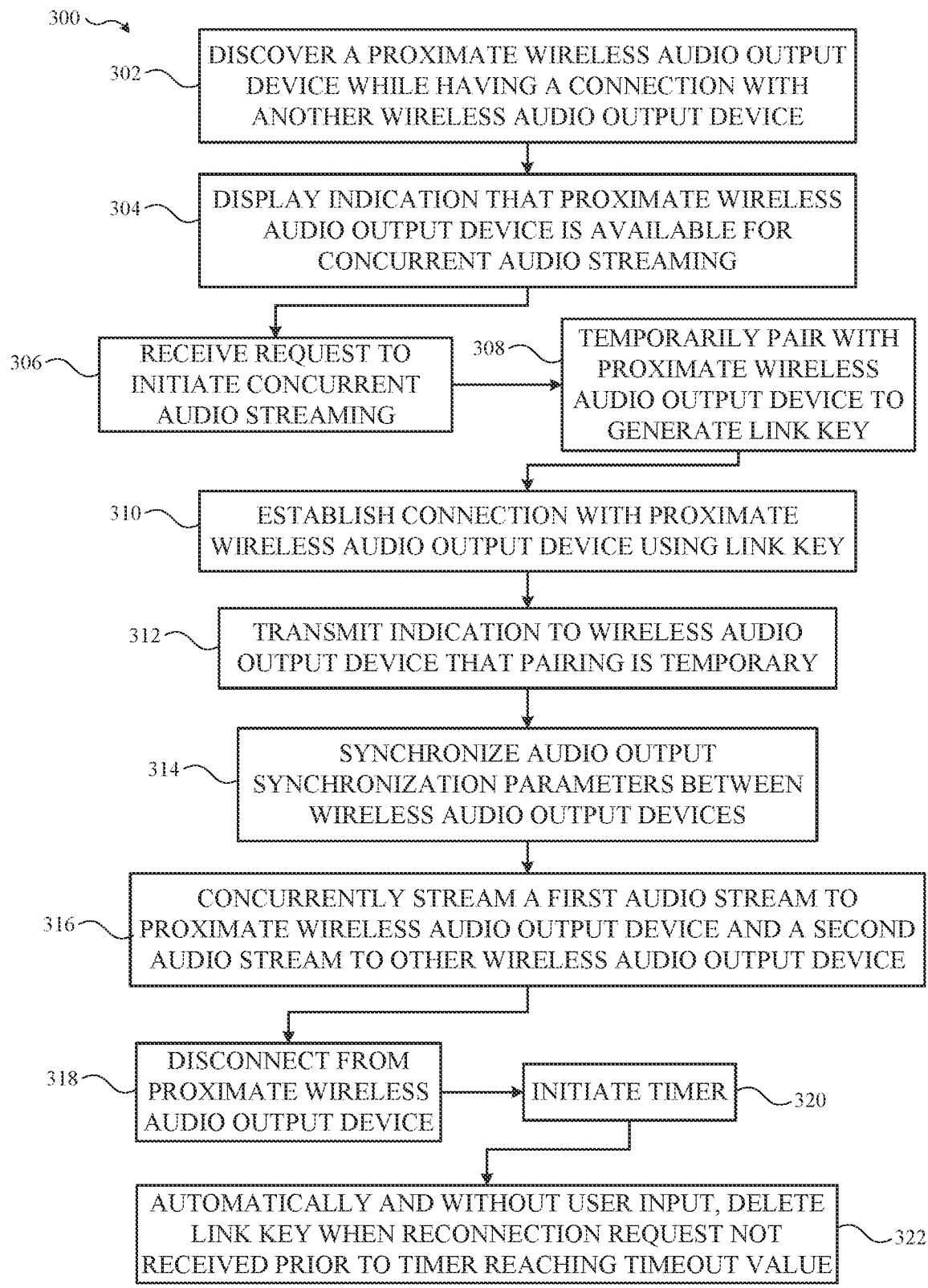
FIG. 3 illustrates a flow diagram of an example process for temporarily pairing with a proximate wireless audio output device for concurrent audio streaming in accordance with one or more implementations.

FIG. 3 illustrates a flow diagram of an example process 300 for temporarily pairing with a proximate wireless audio output device for concurrent audio streaming in accordance with one or more implementations. For explanatory purposes, the process 300 is primarily described herein with reference to the electronic device 102A and the wireless audio output devices 104A-B of FIGS. 1-2. However, the electronic device 102A and the wireless audio output devices 104A-B are presented as exemplary devices and the operations described herein may be performed by any suitable devices. Further, for explanatory purposes, the operations of the process 300 are described herein as occurring in serial, or linearly. However, multiple operations of the process 300 may occur in parallel, such that they at least partially overlap in time. In addition, the operations of the process 300 need not be performed in the order shown and/or one or more of the operations of the process 300 need not be performed and/or can be replaced by other operations.

The process 300 begins when an electronic device 102A discovers a proximate wireless audio output device 104B while the electronic device 102A is connected to another wireless audio output device 104A (302). For example, the wireless audio output device 104B (and/or the electronic device 102A) may transmit broadcast packets that indicate a current state of the wireless audio output device 104B, such as connected, in-ear, in-case, and the like. In one or more implementations, the electronic device 102A and the wireless audio output device 104A may be associated with a first user account, such as with the service provider server 108, and the wireless audio output device 104B may be associated with a second, different, user account. One or more of the broadcast packets may be received by the electronic device 102A, and, based on receipt of the broadcast packets, the electronic device 102A may discover and/or detect that the wireless audio output device 104B is nearby or proximate.

In one or more implementations, the broadcast packets may also indicate whether the proximate wireless audio output device 104B is capable of performing a temporary pairing and/or is otherwise capable of participating in concurrent streaming. As part of the discovery process, the electronic device 102A may also verify, e.g., based on the received broadcast packets, that the proximate wireless audio output device 104B is capable of participating in concurrent streaming.

Upon discovering the proximate wireless audio output device 104B (302), the electronic device 102A may display an indication that the proximate wireless audio output device 104B is available for concurrent streaming (304). For example, the electronic device 102A may display a pop-up user-interface element (e.g., a pop-up sheet) and/or a notification indicating that the wireless audio output device 104B is available for concurrent audio streaming. In one or more implementations, the electronic device 102B may provide an audio notification, a haptic notification, and/or another form of notification, in lieu of and/or in addition to displaying the indication.

Responsive to displaying the indication (304), the electronic device 102A may receive a request, such as from a user, to initiate concurrent audio streaming with the wireless audio output device 104B and, e.g., the wireless audio output device 104A that is currently connected to the electronic device 102A (306). The electronic device 102A may temporarily pair with the wireless audio output device 104B to generate a link key (308). The pairing may be and/or may include, for example, a Bluetooth pairing mechanism, such as secure simple pairing, or generally any form of pairing. For example, user input with respect to the wireless audio output device 104B, and/or a case associated with the wireless audio output device 104B, such as pressing a button, may be included in the pairing. In one or more implementations, the pairing may also involve the exchange of additional information, such as communication addresses including Bluetooth classic addresses.

The electronic device 102A may then automatically, and without user input, establish a connection with the proximate wireless audio output device 104B using the link key, and/or based at least in part on the link key (310). In one or more implementations, when the wireless audio output devices 104A-B are connected to the electronic device 102A via Bluetooth connections, the Bluetooth controller of the electronic device 102A may maintain a separate connection for each of the wireless audio output devices 104A-B. Accordingly, packets can be individually transmitted to the wireless audio output devices 104A-B, and one or more link parameters of the connections can be individually managed and/or maintained. For example, if an acknowledgment of one or more packets is not received from the wireless audio output device 104A for a threshold amount of time, the electronic device 102A may stop waiting for the acknowledgment and transmit packets to the wireless audio output device 104B. In this manner, both wireless audio output devices 104A-B are not penalized if one of the wireless audio output devices 104A-B is experiencing interference and/or otherwise has a poor connection with the electronic device 102A.

Furthermore, in the example of Bluetooth connections, the electronic device 102A may utilize separate and independent Bluetooth profiles for the connection with each of the wireless audio output devices 104A-B, such as A2DP, HFP, AVCRP, and the like. In the example of concurrent streaming audio, the electronic device 102A may utilize a first A2DP profile for the connection with the wireless audio output device 104A and a second, separate, A2DP profile for the connection with the wireless audio output device 104B.

After establishing the connection, the electronic device 102A transmits an indication to the wireless audio output device 104B that the pairing is temporary (312), e.g., that the wireless audio output device 104B should perform predetermined link key maintenance process(es) when the connection with the electronic device 102A is terminated, as is discussed further below. Furthermore, since the pairing is temporary, the electronic device 102A does not store the link key for the connection with the wireless audio output device 104B in association with its user account, e.g., in a cloud storage service provided by the service provider server 108. However, the electronic device 102A may store the link key for the connection with the wireless audio output device 104A in the cloud storage service provided by the service provider server 108 since both devices 102A, 104A are associated with the same user account.

The electronic device 102A may then determine if the same audio content is being streamed to both of the wireless audio output devices 104A-B. If the same audio content is being streamed to both of the wireless audio output devices 104A-B, the electronic device 102A may synchronize one or more audio output synchronization parameters between the wireless audio output devices 104A-B (314). For example, the electronic device 102A may synchronize jitter buffer depth across the wireless audio output devices 104A-B, such as by setting the jitter buffer depth on both wireless audio output devices 104A-B to match the largest jitter buffer depth between the audio output devices 104A-B. The electronic device 102A may also synchronize audio-video synchronization parameters, e.g., an audio delay or shift parameter, such as in the instance that the concurrently streamed audio corresponds to a video being presented on the electronic device 102A.

The electronic device 102A may concurrently stream a first audio stream to the proximate wireless audio output device 104B and a second audio stream to the other wireless audio output device 104A (316). Since the connections are independently maintained/managed by the electronic device 102A, the electronic device 102A can independently modify one or more audio properties of each stream, such as volume, bass, tone, or generally any audio property. Similarly, the electronic device 102A can independently change the audio stream being streamed to each of the wireless audio output devices 104A-B. For example, if users wearing the wireless audio output devices 104A-B are watching video content, such as a movie, the electronic device 102A can stream a first audio stream to the wireless audio output device 104A, such as an English-language audio track, and a second audio stream to the wireless audio output device 104B, such as a secondary language audio track, a director's commentary, or the like. However, since in this instance the users are viewing the same video content, the electronic device 102A may still synchronize one or more audio output synchronization parameters on the wireless audio output devices 104A-B, even though the audio content being streamed to each of the wireless audio output devices 104A-B differs.

The electronic device 102A may disconnect from the proximate wireless audio output device 104B (318). For example, the wireless audio output device 104B and the electronic device 102B may move outside of a connection range of one another, the wireless audio output device 104B may be turned off, may run out of power, or may be placed back in its case, the electronic device 102A may run out of power, and/or may disable its wireless functionality (e.g., supporting the connection between the electronic device 102A and the wireless audio output device 104B).

Upon disconnecting from the wireless audio output device 104B, the electronic device 102A initiates a timer (320). The wireless audio output device 104B may also initiate a timer on disconnection, in accordance with the indication of the temporary pairing previously provided by the electronic device 102A. If the wireless audio output device 104B requests to reconnect to the electronic device 102A before the timer reaches a timeout value, the electronic device may automatically, and without user input: reconnect to the wireless audio output device 104B, reset the timer, and/or resume the concurrent audio streaming.

However, if the electronic device 102A does not receive a reconnection request from the wireless audio output device 104B prior to the timer reaching the timeout value (or the expiration of the timer), the electronic device 102A, automatically and without user input, deletes the link key and/or any other stored pairing information corresponding to the wireless audio output device 104B (322). Since, after deleting the link key and/or any other stored pairing information, the electronic device 102A can no longer connect to the wireless audio output device 104B without re-pairing, the deletion of the link key may be an effective unpairing of the electronic device 102A and the wireless audio output device 104B.

Similarly, the wireless audio output device 104B, automatically and without user input, deletes the link key and/or any other stored pairing information pertaining to the electronic device 102A when its timer reaches the timeout value without having reconnected to the electronic device 102A. The wireless audio output device 104B may also, automatically and without user input, reconnect to the last electronic device it was connected to prior to the temporary connection with the electronic device 102A, such as the electronic device 102B.

In one or more implementations, if the other wireless audio output device 104A disconnects from the electronic device 102A but the wireless audio output device 104B remains connected to the electronic device 102A, the electronic device 102A may continue streaming audio to only the wireless audio output device 104B until the audio streaming is completed or stopped, and/or until a timeout period is reached. Once the streaming is completed or stopped and/or the timeout period is reached, the electronic device 102A disconnects from the wireless audio output device 104B, initiates the timer (320), and automatically and without user input, deletes the link key and/or any other stored pairing information corresponding to the wireless audio output device 104B when a reconnection request is not received from the wireless audio output device 104B prior to the timer reaching the timeout value (322).

In one or more implementations, when the wireless audio output device 104B is removed from the concurrent audio streaming via a selector on the electronic device 102A, for example if a user deselects a representation of the wireless audio output device 104B from a user interface corresponding to the concurrent audio streaming, the electronic device 102A may disconnect from the wireless audio output device 104B, initiate the timer (320), and automatically and without user input, delete the link key and/or any other stored pairing information corresponding to the wireless audio output device 104B when a reconnection request is not received from the wireless audio output device 104B prior to the timer reaching the timeout value (322).

In one or more implementations, if the wireless audio output device 104B connects to a different electronic device, such as the electronic device 102B, if the wireless audio output device 104B is actively unpaired from the electronic device 102A, such as via a user interface, and/or if the electronic device 102A changes its audio output route, such as by a user selection of a different audio output device, the electronic device 102A and the wireless audio output device 104A automatically and without user input delete their respective link keys and any corresponding pairing information without initiating the timer. However, in one or more implementations, the electronic device 102A and/or the wireless audio output device 104A may initiate the timer before deleting the link key and any corresponding pairing information.

In one or more implementations, the wireless audio output devices 104A-B may be connected to the electronic device 102A via different types of wireless connections. For example, the electronic device 102A may be connected to the wireless audio output device 104A via a Bluetooth connection, while connected to the wireless audio output device 104B via a WiFi Direct connection, a 60 GHz connection, a Wi-Fi Aware connection, or generally any wireless connection. The electronic device 102A may concurrently stream audio to the wireless audio output devices 104A-B irrespective of the connection types of the wireless audio output devices 104A-B.

Figure 4:
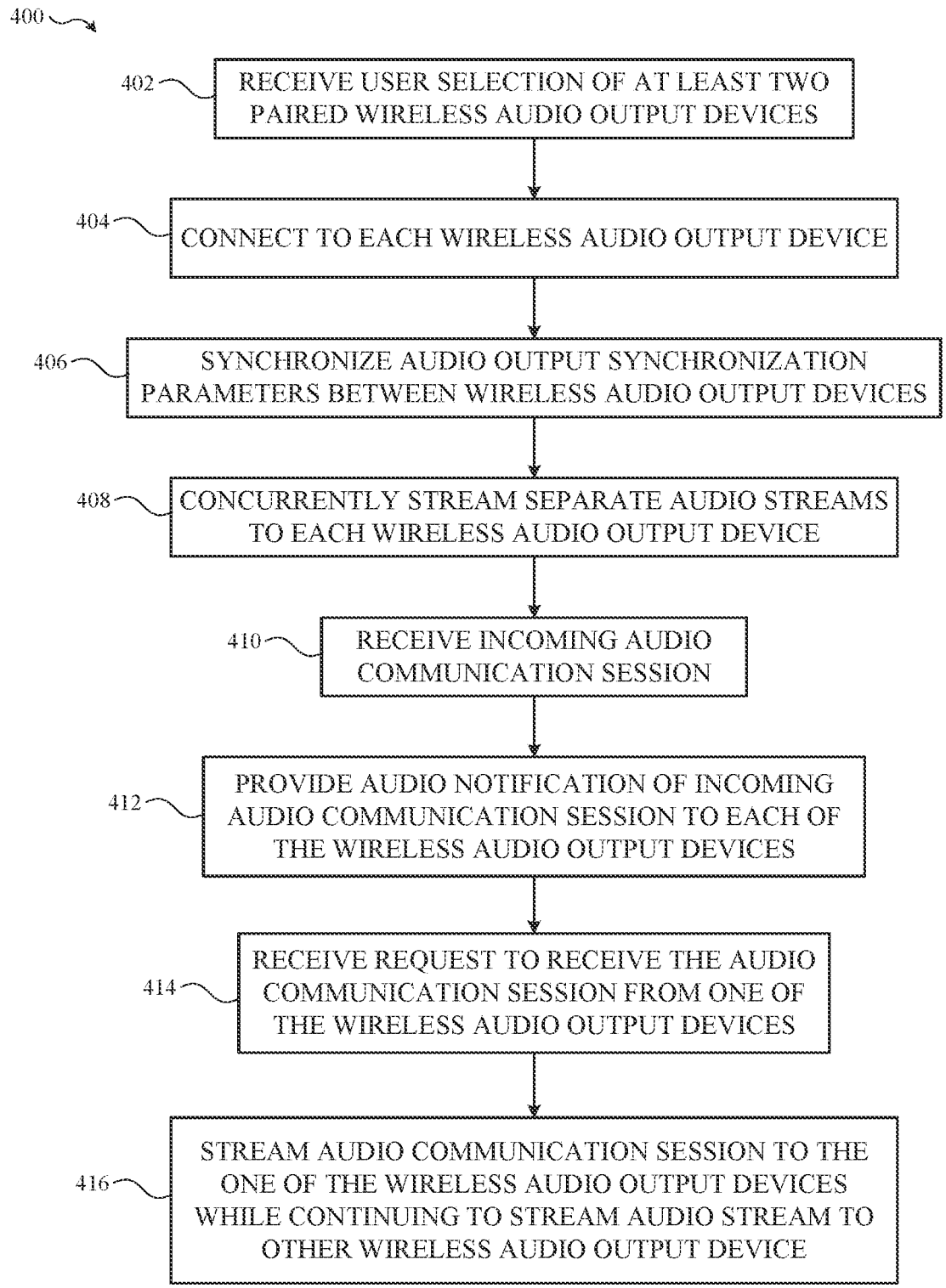
FIG. 4 illustrates a flow diagram of an example process of concurrent audio streaming to multiple wireless audio output devices in accordance with one or more implementations.

FIG. 4 illustrates a flow diagram of an example process 400 of concurrent audio streaming to multiple wireless audio output devices in accordance with one or more implementations. For explanatory purposes, the process 400 is primarily described herein with reference to the electronic device 102A and the wireless audio output devices 104A-B of FIGS. 1-2. However, the electronic device 102A and the wireless audio output devices 104A-B are presented as exemplary devices and the operations described herein may be performed by any suitable devices. Further, for explanatory purposes, the operations of the process 400 are described herein as occurring in serial, or linearly. However, multiple operations of the process 400 may occur in parallel, such that they at least partially overlap in time. In addition, the operations of the process 400 need not be performed in the order shown and/or one or more of the operations of the process 400 need not be performed and/or can be replaced by other operations.

The process 400 begins when the electronic device 102A receives a user selection of at least two paired wireless audio output devices 104A-B (402). For example, the electronic device 102A may display a picker or selector interface that can receive user selections of multiple wireless audio output devices 104A-B, such as in conjunction with outputting a particular audio stream. The wireless audio output devices 104A-B may be both associated with the same user account as the electronic device 102A, or one or more of the wireless audio output devices 104A-B may be associated with a different user account that the electronic device 102A. The electronic device 102A may individually connect to each of the wireless audio output devices 104A-B, if not already connected, (404) and may individually configure communication profiles, such as Bluetooth profiles, with each of the wireless audio output devices 104A-B.

The electronic device 102A may, optionally, synchronize audio output synchronization parameters between the wireless audio output devices 104A-B (406). For example, the electronic device 102A may request that each of the wireless audio output devices 104A-B provide its current parameter configuration, the electronic device 102A may determine one or more synchronized parameters, and the electronic device 102A may transmit the one or more synchronized parameters to each of the wireless audio output devices 104A-B.

The electronic device 102A may then concurrently stream separate audio streams, e.g. with the same audio content, to the wireless audio output devices 104A-B (408). While performing the concurrent audio streaming, the electronic device 102A may receive an incoming audio communication session, such as a telephone call, an audio-video conference call, and the like (410). The electronic device 102A may provide an audio (and/or haptic) notification of the incoming audio communication session to each of the wireless audio output devices 104A-B (412). For example, the electronic device 102A may mux the audio notification into the individual audio streams being concurrent streamed to the wireless audio output devices 104A-B.

The electronic device 102A may receive a request to receive the audio communication session from one of the wireless audio output devices 104A-B, such as the wireless audio output device 104A (414). Responsive to receiving the request, the electronic device 102A streams the audio communication session to the one of the wireless audio output devices, such as the wireless audio output device 104A, while continuing to stream the audio stream to the other(s) of the wireless audio output devices, such as the wireless audio output device 104B (416). Once the audio communication session is completed, the electronic device 102A may resume streaming the audio stream to the wireless audio output device 104A. In one or more implementations, if the electronic device 102A receives a request from both of the wireless audio output devices 104A-B, the electronic device 102A streams the audio communication to the wireless audio output device that transmitted to the request that was received first by the electronic device 102A.

In one or more implementations, when the wireless audio output device 104A is associated with the same user account as the electronic device 102A, and the wireless audio output device 104B is associated with a different user account, the electronic device 102A may only provide audio (and/or haptic) notifications, e.g., of incoming audio communications, to the wireless audio output device 104A that is associated with the same user account as the electronic device 102A. Similarly, if a user wearing the wireless audio output device 104A initiates a voice assistant via the wireless audio output device, the voice assistant responses may only be transmitted to the wireless audio output device 104A, e.g., and not to the wireless audio output device 104B.

Figure 5:
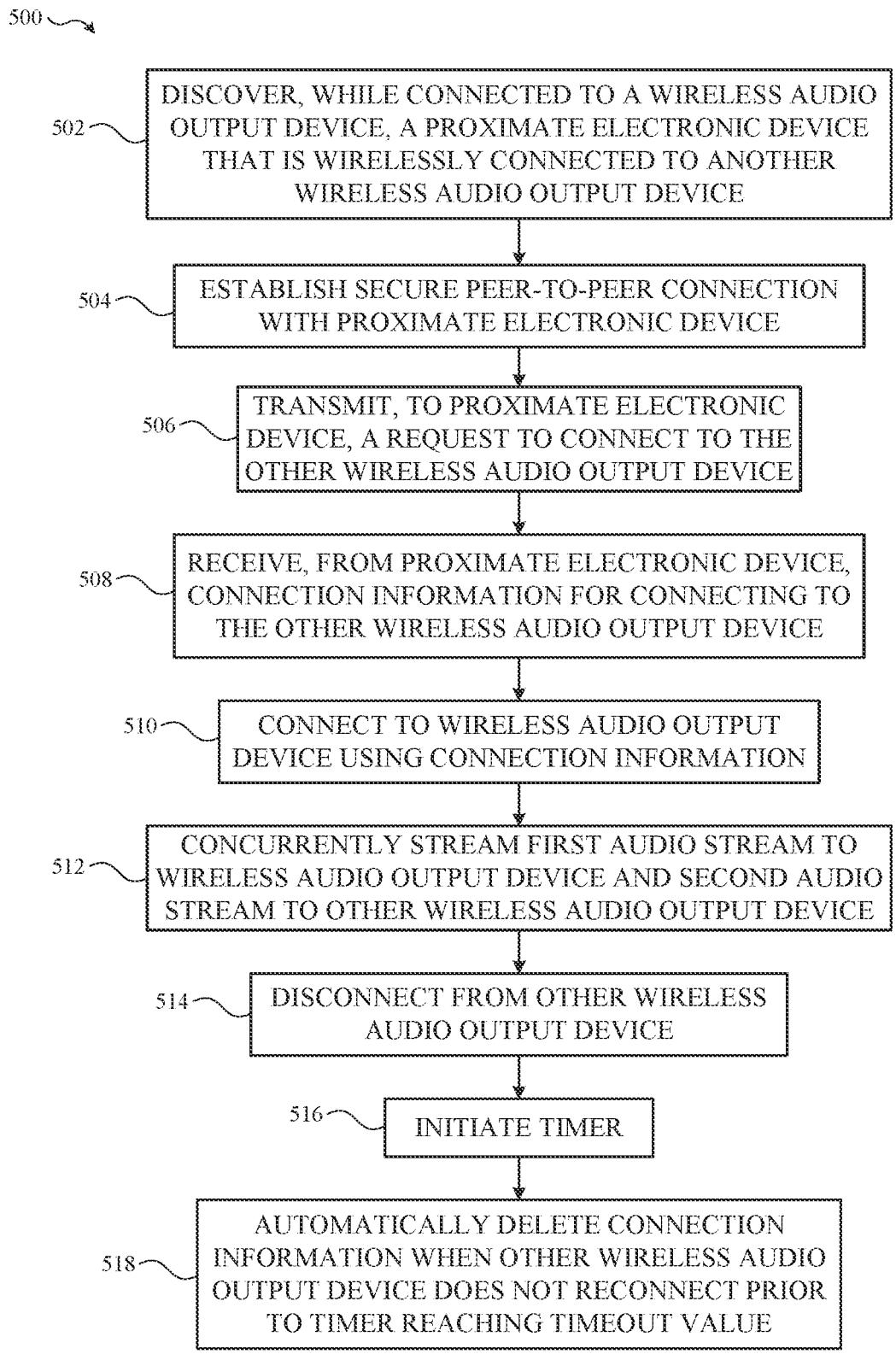
FIG. 5 illustrates a flow diagram of an example process of configuring concurrent audio streaming via a proximate electronic device that is wirelessly coupled to a proximate wireless audio output device in accordance with one or more implementations.

FIG. 5 illustrates a flow diagram of an example process 500 of configuring concurrent audio streaming via a proximate electronic device that is wirelessly coupled to a proximate wireless audio output device in accordance with one or more implementations. For explanatory purposes, the process 500 is primarily described herein with reference to the electronic devices 102A-B and the wireless audio output devices 104A-B of FIG. 1. However, the electronic devices 102A-B and the wireless audio output devices 104A-B are presented as exemplary devices and the operations described herein may be performed by any suitable devices. Further for explanatory purposes, the operations of the process 500 are described herein as occurring in serial, or linearly. However, multiple operations of the process 500 may occur in parallel or at least partially overlap. In addition, the operations of the process 500 need not be performed in the order shown and/or one or more of the operations of the process 500 need not be performed and/or can be replaced by other operations.

The process 500 may begin when the electronic device 102A discovers, while connected to the wireless audio output device 104A, a proximate electronic device 102B that is wirelessly connected to another wireless audio output device 104B (502). For example, the electronic device 102A may detect broadcast packets transmitted by the electronic device 102B, e.g. broadcast packets that indicate that the electronic device 102B is wirelessly connected to the wireless audio output device 104B, and/or the electronic device 102A may detect/discover the electronic device 102B using ultra-wideband ranging, and/or any other discovery mechanism. Upon discovering the proximate electronic device 102B, the electronic device 102A may display an indication of the availability of the wireless audio output device 104B, such as via a user interface.

The electronic device 102A may establish a secure peer-to-peer connection with the proximate electronic device 102B (504), such as upon receiving a user request to connect to the wireless audio output device 104B. For example, the electronic device 102A may establish a secure Bluetooth connection, a secure Wi-Fi Aware connection, a secure NFC connection, or generally any secure connection. In one or more implementations, if the electronic devices 102A-B are not located within a threshold distance of each other, one or more of the electronic devices 102A-B may display an indication for the electronic devices 102A-B to be brought closer together. In one or more implementations, the electronic device 102A may negotiate/exchange an encryption key with the electronic device 102B via an out-of-band channel, such as a communication/messaging channel that supports end-to-end encryption. The electronic devices 102A-B may then use the encryption key to secure the peer-to-peer connection.

The electronic device 102A may transmit to the electronic device 102B a request to connect to the other wireless audio output device 104B (506). The request may be transmitted, for example, via the secure peer-to-peer connection. In one or more implementations, the electronic device 102B may receive the request and may display a user interface requesting that the user of the electronic device 102B confirms that the electronic device 102A can access the wireless audio output device 104B.

If the user confirms that the electronic device 102A can access the wireless audio output device 104B, the electronic device 102B may establish connection information with the wireless audio output device 104B, e.g., pairing information for the subsequent connection between the electronic device 102A and the wireless audio output device 104B. The connection information may be separate and distinct from the connection information used by the electronic device 102B to connect to the wireless audio output device 104B. The connection information, such as pairing information, and other exchanged parameters are discussed further below with respect to FIG. 6. The electronic device 102B may transmit the connection information to the electronic device 102A, such as via the secure peer-to-peer connection.

The electronic device 102A receives, from the proximate electronic device 102B, the connection information for connecting to the other wireless audio output device 104B (508), such as via the secure peer-to-peer connection. In one or more implementations, the received connection information may be different from connection information used by the electronic device 102A to connect to the wireless audio output device 104A. The electronic device 102A connects to the wireless audio output device 104B using the connection information (510). The electronic device 102A transmits a message to the wireless audio output device 104B indicating that the connection is temporary. In one or more implementations, the electronic device 102B may provide an indication to the wireless audio output device 104B that the connection will be temporary, such as while establishing the pairing information. The electronic device 102A may then concurrently stream a first audio stream to the wireless audio output device 104A and a second audio stream to the other wireless audio output device 104B (512).

The electronic device 102A may disconnect from the other wireless audio output device 104B (514). For example, the other wireless audio output device 104B may and/or the electronic device 102A may move out of range of each other. Upon the disconnect, the electronic device 102A may initiate a timer (516) and may automatically, and without user input, delete the connection information when the other wireless audio output device 104B does not reconnect to the electronic device 102A prior to the timer reaching a timeout value (518). The wireless audio output device 104B may also initiate a timer and may automatically, and without user input, delete the connection information when the wireless audio output device 104B does not reconnect to the electronic device 102A prior to the timer reaching the timeout value. In one or more implementations, the wireless audio output device 104B may automatically, and without user input, reconnect to the electronic device 102B upon disconnecting from the electronic device 102A.

Figure 6:
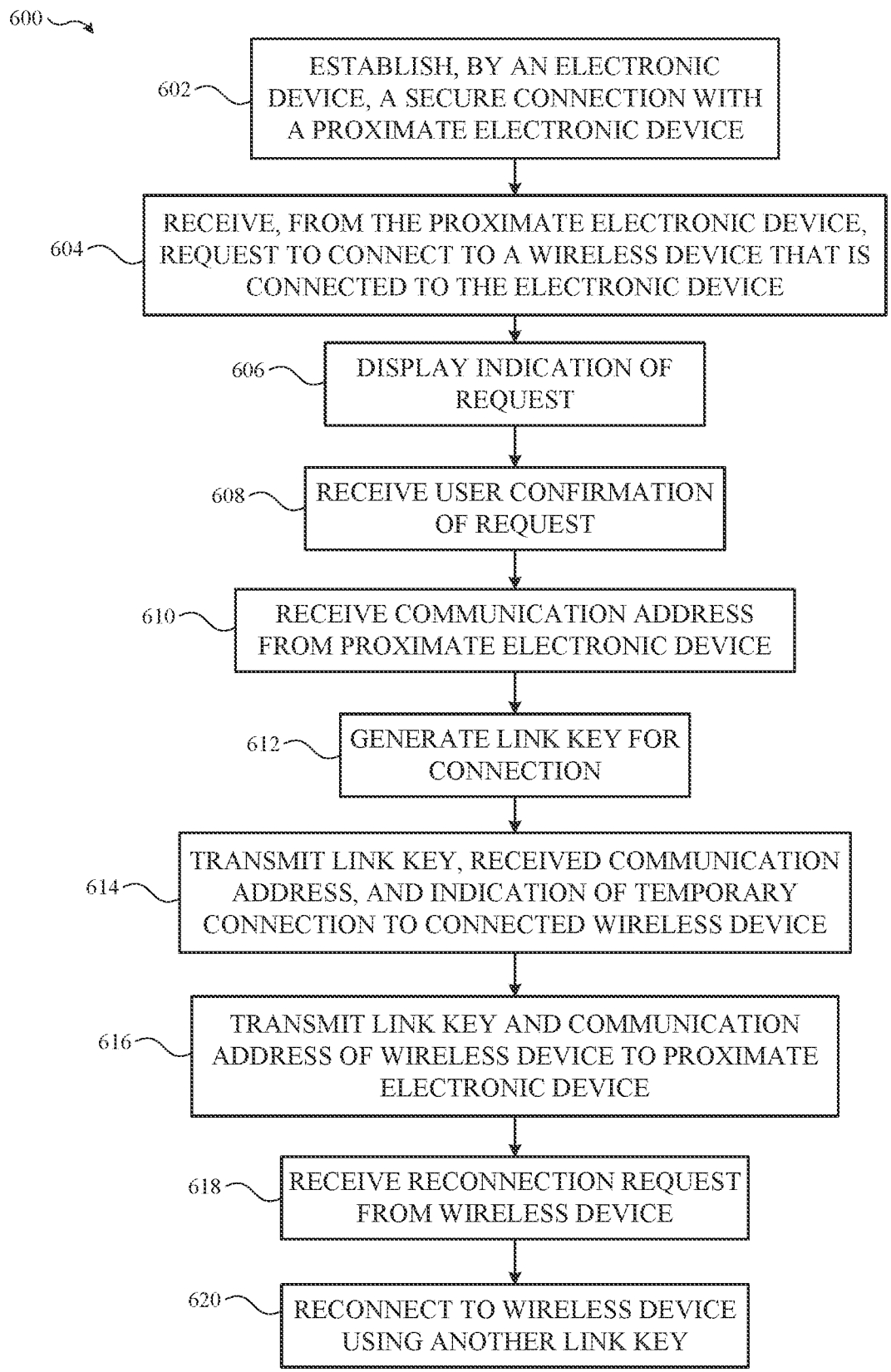
FIG. 6 illustrates a flow diagram of an example process of facilitating a temporary connection between a connected wireless device and a proximate electronic device without a direct pairing of the devices in accordance with one or more implementations.

FIG. 6 illustrates a flow diagram of an example process 600 of facilitating a temporary connection between a connected wireless device and a proximate electronic device without a direct pairing of the devices in accordance with one or more implementations. For explanatory purposes, the process 600 is primarily described herein with reference to the electronic devices 102A-B of FIG. 1. However, the electronic devices 102A-B are presented as exemplary devices and the operations described herein may be performed by any suitable devices. Further for explanatory purposes, the operations of the process 600 are described herein as occurring in serial, or linearly. However, multiple operations of the process 600 may occur in parallel or at least partially overlap. In addition, the operations of the process 600 need not be performed in the order shown and/or one or more of the operations of the process 600 need not be performed and/or can be replaced by other operations.

The process 600 begins when the electronic device 102A establishes a secure connection with the electronic device 102B, such as a secure peer-to-peer connection (602). As discussed above, the electronic device 102A may discover or detect the proximate electronic device 102B, e.g. when the electronic devices 102A-B are within a threshold distance of each other, and the electronic devices 102A-B may establish the secure connection upon discovering and/or detecting one another.

The electronic device 102A may receive, from the proximate electronic device 102B, a request to connect to a wireless device connected to the electronic device 102A (604). For example, the proximate electronic device 102B may request to connect to a wireless audio output device 104A connected to the electronic device 102A, a wireless stylus connected to the electronic device 102A, a game controller connected to the electronic device 102A, or generally any wireless device connected to the electronic device 102A. In one or more implementations, the wireless device may not be connected to the electronic device 102A at the time that the request is received; however, the wireless device may be paired with the electronic device 102A and/or may be within a particular distance of the electronic device 102A, although not connected to the electronic device 102A. In one or more implementations, the wireless device may be associated with the user account that is associated with the electronic device 102A, which may differ from the user account associated with the electronic device 102B.

The electronic device 102A displays an indication of the request, such as to a user (606). For example, the electronic device 102A may display a notification, a pop-up card, or other graphical element(s) indicating that the electronic device 102B is requesting to access the wireless device (606). The indication may request that the user of the electronic device 102A confirm that the electronic device 102B can access the wireless device. The electronic device 102A may receive user confirmation of the request (608). For example, a user of the electronic device 102A may interact with the displayed indication to provide user confirmation.

The electronic device 102A may receive a communication address from the proximate electronic device 102B (610). The communication address may correspond to the communication address of the electronic device 102B to be used for the connection with the wireless device, such as a Bluetooth classic address. The electronic device 102A may generate a link key for the connection between the electronic device 102B and the wireless device (612). The link key may be separate and distinct from the link key used by the electronic device 102A to establish a connection with the wireless device. In one or more implementations, the electronic device 102A may initiate the pairing process with the wireless device on behalf of, and/or as a proxy of, the electronic device 102B.

The electronic device 102A may transmit the link key, the received communication address (e.g., received from the electronic device 102B), and an indication that the connection will be temporary, to the connected wireless device (614), e.g. over the existing connection with the connected wireless device. The electronic device 102A may transmit the link key and the communication address of the wireless device to the proximate electronic device 102B (616), such as over the secure connection. The communication address of the wireless device may be, for example, a classic Bluetooth address that may be locally stored by the electronic device 102A. Thus, through the example process 600, the electronic device 102A is able to allow the electronic device 102B to connect to the wireless device without having directly paired with the wireless device. In one or more implementations, the electronic device 102B may be considered to have indirectly paired with the wireless device via the electronic device 102A.

In one or more implementations, after transmitting the link key and the communication address of the wireless device to the proximate electronic device 102B, the electronic 102A may terminate the secure connection with the proximate electronic device 102B. The wireless device may automatically disconnect from the electronic device 102A upon connecting to the electronic device 102B. The electronic device 102A may receive a reconnection request from the wireless device (618). The electronic device 102A may, automatically and without user input, reconnect to the wireless device using another link key (620), e.g., the link key previously used to connect to the wireless device.

Figure 7:
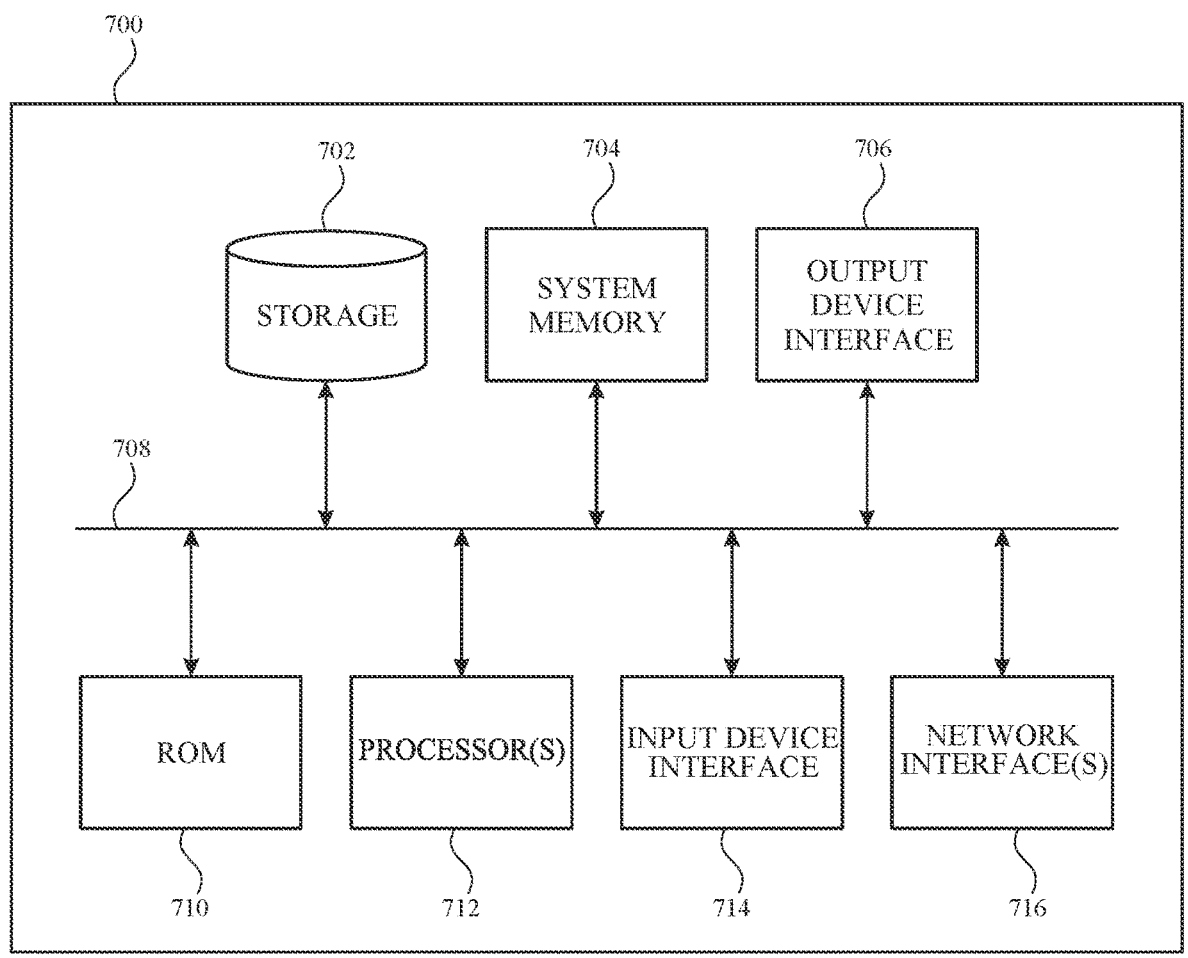
FIG. 7 conceptually illustrates an example electronic system with which aspects of the subject technology may be implemented in accordance with one or more implementations.

FIG. 7 conceptually illustrates an electronic system 700 with which one or more implementations of the subject technology may be implemented. The electronic system 700 can be, and/or can be a part of, one or more of the electronic devices 102A-B, the wireless audio output devices 104A-B, and/or the server 108 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

As described above, one aspect of the present technology is the gathering and use of data available from specific and legitimate sources to improve concurrent audio streaming to multiple wireless audio output devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to select/suggest devices for pairing in accordance with a user's preferences. Accordingly, use of such personal information data enables users to have greater control of the devices selected/suggested for concurrent audio streaming. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of concurrent audio streaming to multiple devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, concurrent audio streaming to multiple wireless audio output devices can be performed based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
obtaining, by a first electronic device having first communications circuitry and a first display and that is paired with a first wireless audio output device that is configured to be worn over or within a human ear, pairing information for a second wireless audio output device that is configured to be worn over or within a human ear, from a second electronic device having second communications circuitry and a second display, without direct communication between the first electronic device and the second wireless audio output device;
connecting, by the first electronic device, to the first wireless audio output device that is paired with the first electronic device;
connecting, by the first electronic device based on the pairing information, to the second wireless audio output device; and
concurrently streaming audio content to the first wireless audio output device and the second wireless audio output device.

2. The method of claim 1, wherein connecting to the second wireless audio output device comprises connecting to the second wireless audio output device using the pairing information while the first electronic device is paired with and connected to the first wireless audio output device.

3. The method of claim 1, wherein the pairing information comprises a link key generated by the second electronic device, and a communication address for the second wireless audio output device.

4. The method of claim 3, wherein the first electronic device is paired with the first wireless audio output device using an additional link key, different from the link key.

5. The method of claim 1, wherein obtaining the pairing information comprises receiving the pairing information responsive to a request, transmitted to the second electronic device from the first electronic device, to connect to the second wireless audio output device, the request having been transmitted responsive to a user input at the first electronic device.

6. The method of claim 1, further comprising receiving, by the first electronic device from the second electronic device, an indication that the first electronic device should, automatically and without user input, delete the pairing information when a timer initiated upon disconnecting from the second wireless audio output device reaches a timeout value without having reconnected to the second wireless audio output device using the pairing information.

7. The method of claim 6, further comprising:
initiating, by the first electronic device, a timer upon disconnecting from the second wireless audio output device; and
automatically and without user input, deleting, by the first electronic device, the pairing information when the timer reaches the timeout value without having reconnected to the second wireless audio output device using the pairing information.

8. The method of claim 6, further comprising:
initiating, by the first electronic device, a timer upon disconnecting from the second wireless audio output device; and
automatically and without user input, reconnecting, by the first electronic device to the second wireless audio output device using the pairing information, responsive to detecting the second wireless audio output device after disconnecting and before the timer reaches the timeout value.

9. An electronic device, comprising:
first communications circuitry;
a first display; and
one or more processors,
wherein the electronic device comprises a first electronic device, wherein the electronic device is paired with a first wireless audio output device that is configured to be worn over or within a human ear, and wherein the one or more processors are configured to:
obtain pairing information for a second wireless audio output device that is configured to be worn over or within a human ear, from a second electronic device having second communications circuitry and a second display, without direct communication between the first electronic device and the second wireless audio output device;
connect to the first wireless audio output device that is paired with the first electronic device;
connect, based on the pairing information, to the second wireless audio output device; and
concurrently stream audio content to the first wireless audio output device and the second wireless audio output device.

10. The electronic device of claim 9, wherein the one or more processors are configured to connect to the second wireless audio output device using the pairing information while the first electronic device is paired with and connected to the first wireless audio output device.

11. The electronic device of claim 9, wherein the pairing information comprises a link key generated by the second electronic device, and a communication address for the second wireless audio output device.

12. The electronic device of claim 11, wherein the electronic device is paired with the first wireless audio output device using an additional link key, different from the link key.

13. The electronic device of claim 9, wherein the one or more processors are configured to obtain the pairing information responsive to a request, transmitted to the second electronic device from the electronic device, to connect to the second wireless audio output device, the request having been transmitted responsive to a user input at the electronic device.

14. The electronic device of claim 9, wherein the one or more processors are further configured to receive, from the second electronic device, an indication that the electronic device should, automatically and without user input, delete the pairing information when a timer initiated upon disconnecting from the second wireless audio output device reaches a timeout value without having reconnected to the second wireless audio output device using the pairing information.

15. The electronic device of claim 14, wherein the one or more processors are further configured to:
initiate a timer upon disconnecting from the second wireless audio output device; and
automatically and without user input, delete the pairing information when the timer reaches the timeout value without having reconnected to the second wireless audio output device using the pairing information.

16. The electronic device of claim 14, wherein the one or more processors are further configured to:
- initiate a timer upon disconnecting from the second wireless audio output device; and
- automatically and without user input, reconnect to the second wireless audio output device using the pairing information, responsive to detecting the second wireless audio output device after disconnecting and before the timer reaches the timeout value.

17. A non-transitory computer readable medium storing instructions which, when executed by one or more processors, cause the one or more processors to perform operations comprising:
- obtaining, by a first electronic device having first communications circuitry and a first display and that is paired with a first wireless audio output device that is configured to be worn over or within a human ear, pairing information for a second wireless audio output device that is configured to be worn over or within a human ear, from a second electronic device having second communications circuitry and a second display, without direct communication between the first electronic device and the second wireless audio output device;
- connecting, by the first electronic device, to the first wireless audio output device that is paired with the first electronic device;
- connecting, by the first electronic device based on the pairing information, to the second wireless audio output device; and
- concurrently streaming audio content to the first wireless audio output device and the second wireless audio output device.

18. The non-transitory computer readable medium of claim 17, wherein connecting to the second wireless audio output device comprises connecting to the second wireless audio output device using the pairing information while the first electronic device is paired with and connected to the first wireless audio output device.

19. The non-transitory computer readable medium of claim 17, wherein the pairing information comprises a link key generated by the second electronic device, and a communication address for the second wireless audio output device.

20. The non-transitory computer readable medium of claim 19, wherein the first electronic device is paired with the first wireless audio output device using an additional link key, different from the link key.

* * * * *